United States Patent [19]

Sokhey et al.

[11] Patent Number: 5,769,317

[45] Date of Patent: Jun. 23, 1998

[54] AIRCRAFT THRUST VECTORING SYSTEM

[75] Inventors: Jack (Jagdish) Singh Sokhey, Loveland, Ohio; Andrew James Crook, Indianapolis, Ind.; Philip Harold Snyder, Plainfield, Ind.; Baily R. Vittal, Indianapolis, Ind.

[73] Assignee: Allison Engine Company, Inc., Indianapolis, Ind.

[21] Appl. No.: 433,675

[22] Filed: May 4, 1995

[51] Int. Cl.$^6$ .................................................. F02K 1/78
[52] U.S. Cl. ........................................ 239/1; 239/265.23
[58] Field of Search .................. 234/265.19–265.39; 239/540; 60/230, 228, 232

[56] References Cited

U.S. PATENT DOCUMENTS

| | | | |
|---|---|---|---|
| 2,879,014 | 3/1959 | Smith et al. ........................... | 60/232 X |
| 3,151,446 | 10/1964 | Parilla .................................... | 60/232 X |
| 3,299,638 | 1/1967 | Santamaria et al. ........... | 239/265.19 X |
| 3,358,453 | 12/1967 | Swet ...................................... | 60/232 X |
| 3,380,660 | 4/1968 | Markowski . | |
| 3,475,912 | 11/1969 | Angier ........................... | 239/265.29 X |
| 3,490,236 | 1/1970 | Markowski . | |
| 3,528,247 | 9/1970 | Riemerschmid ......................... | 60/232 |
| 3,625,432 | 12/1971 | Bragg . | |
| 3,704,829 | 12/1972 | Hall . | |
| 3,835,643 | 9/1974 | DeGarcia, Jr. et al. . | |
| 4,000,610 | 1/1977 | Nash et al. ............................. | 60/232 X |
| 4,280,660 | 7/1981 | Wooten, Jr. et al. . | |
| 4,474,345 | 10/1984 | Musgrove . | |
| 4,587,806 | 5/1986 | Madden . | |
| 4,587,809 | 5/1986 | Horinouchi et al. ............... | 239/265.35 |
| 4,660,767 | 4/1987 | Scrace . | |
| 4,805,401 | 2/1989 | Thayer et al. . | |
| 4,836,451 | 6/1989 | Herrick et al. . | |
| 4,922,711 | 5/1990 | Brown . | |
| 5,142,862 | 9/1992 | Brown . | |
| 5,209,428 | 5/1993 | Bevilaqua et al. . | |

FOREIGN PATENT DOCUMENTS 1210259  10/1960  Germany .................................. 60/232

OTHER PUBLICATIONS

Article entitled "NASA–Lewis Tests Allison ASTOVL Nozzle" by Stanley W. Kandebo published in Aviation Week & Space Technology, May 9, 1994.

Article entitled "Lockheed, Pratt Test ASTOVL Concept" by Stanley W. Kandebo in Aviation Week & Space Technology, Mar. 6, 1995.

*Primary Examiner*—Kevin Weldon
*Attorney, Agent, or Firm*—Woodard, Emhardt, Naughton, Moriarty & McNett

[57] ABSTRACT

A thrust vectoring system comprising a working fluid source mounted to an aircraft, and a vectoring nozzle connected to the working fluid source which has an extendable conduit defining a passage from an inlet to an outlet. The passage is adjustable so that the direction of the working fluid exiting the outlet is different than the working fluid entering the inlet when the conduit of the vectoring nozzle is extended. This conduit provides a way to change the direction of working fluid exiting the nozzle and correspondingly change the thrust vector of the aircraft. A directing member such as a guide vane or door is mounted to the conduit adjacent the outlet to further direct the working fluid exiting the outlet. Directing members provide a way to refine the thrust vector without changing the extension of the segmented conduit. Another aspect of the present invention is to provide an adapter to connect the vectoring nozzle to a working fluid source with an annular outlet. This adapter uses an asymmetric structure to minimize flow separation.

100 Claims, 9 Drawing Sheets

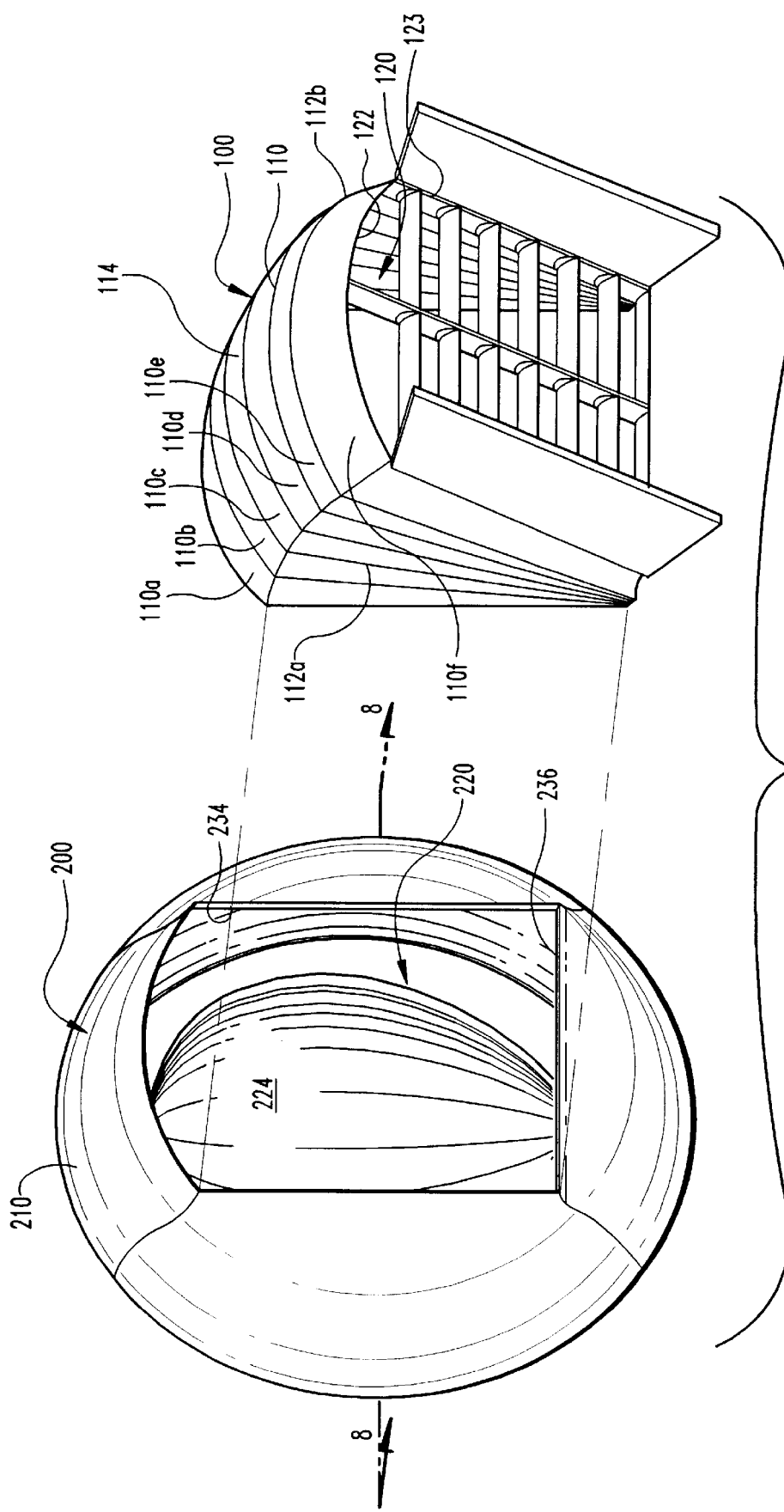

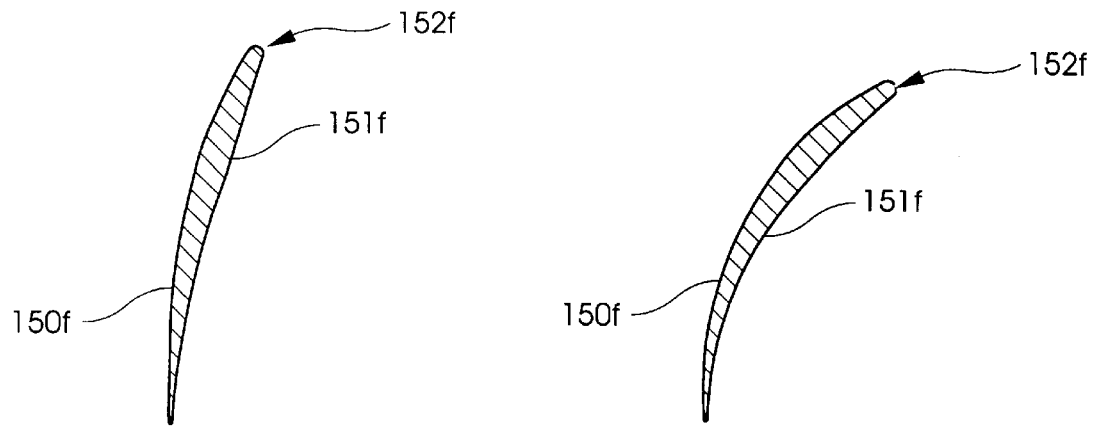
Fig. 4A          Fig. 4B
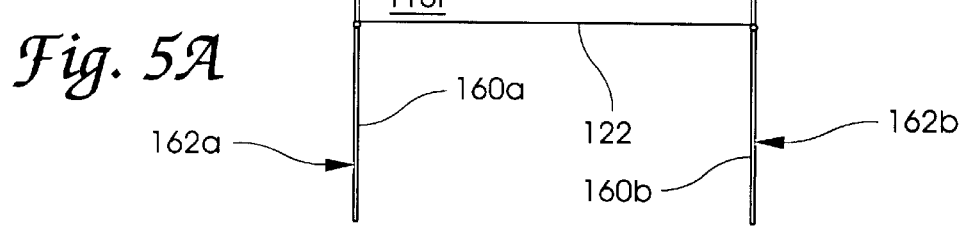
Fig. 5A
Fig. 5B
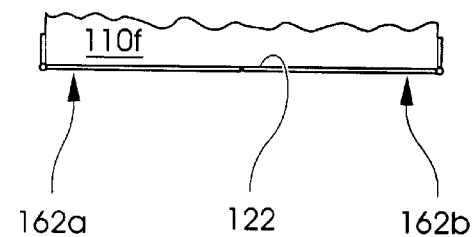
Fig. 5C

AIRCRAFT THRUST VECTORING SYSTEM

The U.S. Government has a paid-up license in this invention and the right in limited circumstances to require the patent owner to license others on reasonable terms as provided for by the terms of Contract No. MDA972-93-C-0025 awarded by the Department of Defense.

BACKGROUND OF THE INVENTION

This invention relates to a system for vectoring thrust of an aircraft. Typically, a jet powered aircraft is controllably propelled by thrust substantially parallel with and in a direction opposite to working fluid exiting a nozzle. Consequently, if the direction of the working fluid is changed, the direction of propulsive thrust and the aircraft direction is correspondingly varied. The hot gases exhausted from a gas turbine engine are one source of working fluid which may be vectored. Alternatively, "cold flow" from a lift fan may also serve as a working fluid source. Such a lift fan is generally mounted vertically in the aircraft and is often driven by an indirect coupling to a gas turbine engine. Notably, fewer materials are suitable for vectoring systems which come in contact with the hot exhaust gases of a gas turbine engine as compared to the relatively colder working fluid provided by a lift fan.

With the advent of vertical or short take off and vertical landing (V/STOVL) aircraft, the need for efficient, uninterrupted vectoring of thrust has arisen. For the V/STOVL mode, a continuous, uninterrupted vectoring of thrust is required throughout a wide angular range to provide lift for the aircraft. Also, a smooth and reliable transition to the horizontal or cruise mode is required. Moreover, as with most aircraft equipment, thrust vectoring systems must be lightweight and compactly stowable when not in use.

Several patents reveal a segmented turning hood such as U.S. Pat. Nos. 3,490,236 to Markowski, 3,704,829 to Hall and 3,835,643 to De Garcia, Jr. et al. These devices generally contemplate a gas turbine engine which is horizontally oriented. This gas turbine engine would provide for efficient forward propulsion in the cruise mode. A turning hood is extended from the gas turbine engine to create a vertical thrust component to assist with V/STOVL mode operation of the aircraft. These devices can efficiently change the direction of working fluid more than 90° using a curved passage. Unfortunately, the ability to extend and retract turning hoods in response to changing conditions such as wind gusts and shifts in aircraft load during the V/STOVL mode is limited. This limitation is particularly severe regarding the ability to change between fore and aft pitch vectoring. Also, independent and simultaneous yaw control is generally not available. Thus, a way to provide pitch and yaw adjustments during the V/STOVL mode without changing the extension of a turning hood is needed.

Still other vectoring devices employ a cascade guide vane bank as shown in U.S. Pat. No. 4,805,401 to Thayer et al. As depicted in this patent, these guide vanes may provide for a refined vectoring adjustment over a range which is typically smaller than possible with a segmented turning hood. However, the device is mechanically complex, requiring a convergent flap and associated control structure to direct the working fluid along multiple paths. As a result, the simplicity of vectoring made possible by a segmented turning hood is lost. Similarly, movable flaps or doors, as depicted in U.S. Pat. No. 4,836,451 to Herrick et al., provide for vectoring of working fluid, but involve complex structure with multiple flow paths that cannot be as efficiently stowed as a multiple segment turning hood.

U.S. Pat. No. 4,000,610 to Nash et al. uses flaps with an adjustable hood configuration. However, the flaps are not directed to refined vectoring. Instead, the external wing flap provides a limited degree of vertical deflection and an internal flap is used to adjust the cross-sectional area of an internal throat of the deflector. Moreover, the adjustable hood does not stow as efficiently as the nested pieces of a multiple segment turning hood. In addition, the longitudinal structure dedicated to the vectoring apparatus hampers efficient stowage. The length of vectoring apparatus for systems with a horizontally oriented gas turbine engine is not highly critical because it can be readily aligned with the engine to minimize drag in the cruise mode. However, a vertically mounted thrust source, such as a lift fan, has an axis generally perpendicular to the direction of flight in the cruise mode. As a result, the vectoring apparatus attached to a lift fan is vertically oriented and must be extremely compact to avoid presenting appreciable drag when stowed for cruise mode.

Therefore, what is needed is a thrust vectoring system that provides for a wide range of thrust vectoring including fore and aft pitch simultaneous with yaw control. This system should be responsive to sudden changes during the V/STOVL mode. Moreover, the vectoring apparatus should be stowable during cruise mode to minimize drag. Also, even when deployed, it is desirable that the vectoring system occupy as little space as possible to enhance maneuverability and decrease weight.

SUMMARY OF THE INVENTION

The present invention is a thrust vectoring system for an aircraft. The system includes a working fluid source connected to the aircraft providing working fluid to an extendable conduit. This extendable conduit defines a passage from an inlet to an outlet. The inlet is connected to the working fluid source. The passage is adjustable so that the direction of working fluid exiting the outlet is different than the direction of working fluid entering when the conduit is extended. Furthermore, the passage is generally straight when the conduit is unextended or stowed. Thus, the extendable conduit provides a way to direct working fluid and vector thrust.

In one embodiment of the present invention, the extendable conduit has a plurality of coupled segments including a base segment connected to the working fluid source and a discharge segment adjacent the outlet. Collectively, these segments are configured to form a segmented turning hood defining a passage from an inlet to an outlet. The passage is adjustable so that the direction of working fluid exiting the outlet is different than the direction of working fluid entering the inlet when the conduit is extended. Moreover, the passage is generally straight when the conduit is unextended. In this embodiment, at least one member of the plurality of coupled segments is configured to nest within at least a portion of an adjacent member when the conduit is unextended. In one embodiment, each segment of the conduit has a pair of generally parallel side walls joined by an arcuate outer wall to form a U-shape. As a result, when extended these segments form an open portion of the resulting conduit along the inner bend of the curved passage formed by the extended segments.

The discharge segment includes a discharge portion. The discharge portion includes opposing side walls joined by an arcuate outer wall similar to the other segments. Also, in one embodiment, the discharge segment includes an inner wall framing the outlet in a D-shape.

In one preferred embodiment of the present invention, at least one directing member, such as a guide vane or door is mounted to the conduit adjacent the outlet to controllably and selectively provide additional vectoring capability of working fluid as it exits. For a segmented turning hood, the directing member is preferably mounted to the discharge portion of the discharge segment. The directing member is configured with a directing surface which moves relative to the conduit or hood. This directing surface comes in contact with the working fluid to be redirected and controllably and selectively blocks or deflects its flow. The directing member imparts a directional vector to working fluid exiting the passage by changing the position of the directing surface relative to the conduit. A directing member offers a way to conveniently refine the direction of working fluid exiting a vectoring nozzle without the need of adjusting the position of the outlet of an extendable conduit or turning hood.

In yet another aspect of the present invention, the thrust vectoring system includes a first directing member mounted to the discharge portion adjacent the outlet which is oriented to selectively impart a directional component to working fluid exiting the outlet along a first axis lateral to the outlet. In this context, an axis "lateral to the outlet" means an axis that is approximately parallel to a plane containing the exit area of the outlet. Also, the thrust vectoring system includes a second directing member mounted to the discharge portion adjacent the outlet which is oriented to selectively impart a directional component to working fluid exiting the outlet along a second axis lateral to the outlet. This second axis is substantially different from the first axis. Directing members so oriented offer a secondary vectoring capability along any direction in a plane containing the area of the outlet in addition to the primary vectoring offered by positioning the outlet by extending the conduit or turning hood. In one variation, the first and second directing members are oriented so that the first axis is approximately perpendicular to the second axis.

The most preferred embodiment of the present invention having directing members includes a cascade guide vane bank combined with opposing doors as directing members. In this most preferred embodiment, the directing members are oriented so that each guide vane selectively imparts a directional component along a first axis lateral to the outlet and the doors impart a directional component along a second axis lateral to the outlet and substantially different from the first axis.

Thus, the present invention offers a method to vector thrust by: (1) connecting an inlet of an extendable conduit to a working fluid source, (2) providing working fluid from the thrust source so that working fluid flows through a passage of the conduit from the inlet to an outlet, (3) establishing a first thrust direction by extending the conduit and shaping the passage so that the direction of working fluid exiting the outlet is different than the direction of working fluid entering the inlet, and (4) establishing a second thrust direction by positioning a guide vane mounted in the passage adjacent the outlet to deflect working fluid as it passes through the outlet. Optionally, one or more directing members in addition to the guide vane can be utilized for establishing a third thrust direction substantially different from the first or second thrust directions.

Embodiments employing a directing member in combination with a segmented turning hood offer a method of vectoring thrust by: (1) connecting an inlet of an extendable conduit with a passage defined by a plurality of coupled segments including a base segment connected to a working fluid source and a discharge segment adjacent an outlet, (2) providing working fluid from the working fluid source so that working fluid flows through the passage from the outlet to the inlet, (3) establishing a first thrust direction by extending the conduit and shaping the passage so that the direction of working fluid exiting the outlet is different than the direction of working fluid entering the inlet, and (4) establishing a second thrust direction by positioning a directing member mounted to the discharge segment adjacent the outlet to direct working fluid as it passes through the outlet. Optionally, a third thrust direction substantially different from either the first or second thrust directions is possible with a second directing member.

Another aspect of the present invention is an adapter to efficiently connect a working fluid source with an approximately annular outlet to the contiguous inlet of an extendable conduit. This adapter is designed to occupy minimal space and to reduce flow separation. The adapter includes a shroud with a surface defining an opening at a first end and an aperture at a second end opposing the first end. The aperture has a smaller cross-sectional area than the opening and the aperture is connected to the vectoring nozzle.

The adapter also includes a centerbody with at least a portion enclosed within the interior of the shroud. The centerbody has a base connected to the working fluid source and is spaced apart from the surface of the shroud to define an adapter passage therebetween for receiving working fluid. The adapter passage is formed to circumscribe at least a portion of the base. Also, the centerbody has a head formed on an end opposite the base. The head is spaced apart from the shroud surface at the second end to form a chamber therebetween which intersects the aperture and the adapter passage. The chamber is formed to converge working fluid flowing from the adapter passage toward the aperture. Furthermore, the head has an asymmetric shape to decrease flow separation of working fluid flowing from the adapter passage, through the chamber and out the aperture.

The adapter is especially suited for use with a vectoring nozzle configured as an adjustable hood defining a curved working fluid passage bounded by a curved outer wall. The turning hood may include a plurality of coupled segments to form a type of extendable conduit, or may have a fixed working fluid deflection path. Specifically, the head cooperates with the shroud to form the chamber so that working fluid passing from a portion of the adapter passage opposite the curved outer wall and exiting through the aperture is directed toward the outer wall as it exits. In one variation, the aperture and turning hood are configured to define a vent opposite the outer wall to reduce flow separation.

In summary, one object of the present invention is to provide a system of vectoring thrust using an extendable conduit which offers refined vectoring without changing the extension of the conduit, and yet still provides for the large range of vectors required for V/STOVL aircraft operation. A related object of the invention is to add a refined vectoring capability to a segmented turning hood which does not require the movement of one or more segments of the turning hood. Another related object of the present invention is to accommodate connection of the thrust vectoring system to a vertically mounted lift fan.

Another object of the invention is to variably and selectively impart a directional component to working fluid exiting a vectoring nozzle without changing the position of the vectoring nozzle conduit or the shape of the working fluid passage. This directional component lies in a plane parallel to a plane containing the exit area of the nozzle.

A further object of the present invention is to make the thrust vectoring system readily stowable in a small space. To that end, an adapter which connects to a working fluid source with an annular outlet and provides an aperture configured for contiguous connection to the passage of a vectoring nozzle is desirable.

It is another object of the present invention to minimize flow separation of working fluid as it travels through the thrust vectoring system and to maximize vectoring nozzle efficiency. It is preferred the dimensions of the system and specifications of the working fluid source be arranged so that working fluid exiting the system can have a speed up to a Mach number of unity.

BRIEF DESCRIPTION OF THE DRAWINGS

FIG. 2 is an exploded view of one embodiment of the vectoring nozzle and working fluid source adapter of the present invention.

FIG. 4A is a cross-sectional view along the end of one of the guide vanes shown in FIG. 2.

FIG. 4B is a cross-sectional view near the midpoint of the guide vane shown in FIG. 4A.

FIG. 5A is a top plan view of the doors of the present invention.

FIG. 5B is a top plan view of the doors shown in FIG. 5A in a different position.

FIG. 5C is a top plan view of the doors shown in FIGS. 5A and 5B in a closed position.

DESCRIPTION OF THE PREFERRED EMBODIMENT

Figure 1A:
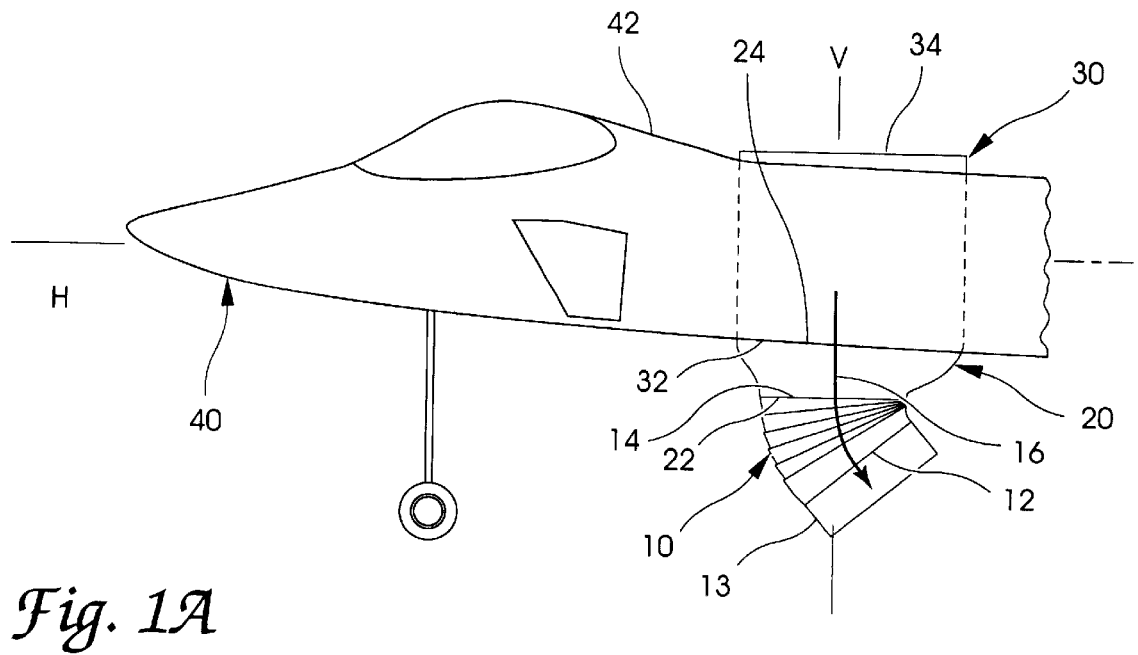
FIG. 1A is a side elevational view of one embodiment of the thrust vectoring system mounted on an aircraft.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
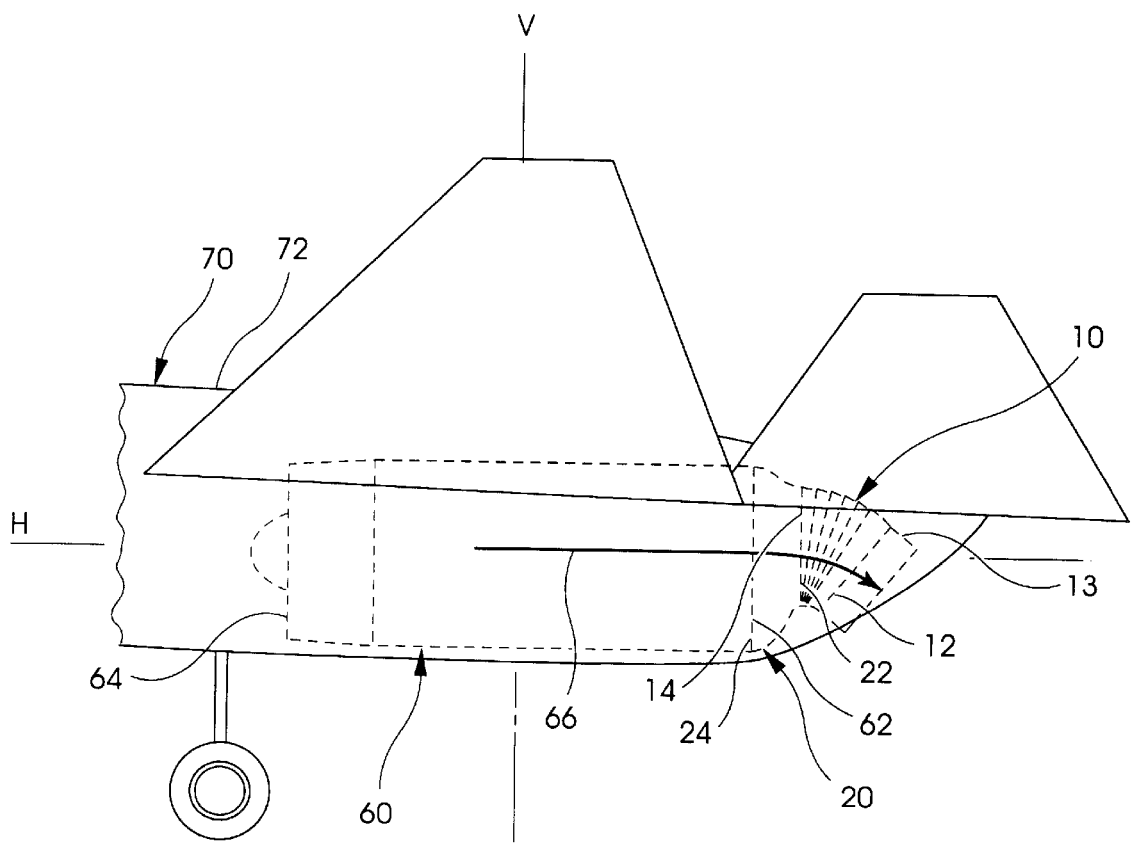
FIG. 1B is a side elevational view of another embodiment of the thrust vectoring system mounted on an aircraft.

Referring to FIGS. 1A and 1B, two thrust vectoring systems of the present invention are shown. In particular, the mounting of the thrust vectoring systems to an aircraft is depicted. Referring specifically to FIG. 1A, a thrust vectoring nozzle 10 with outlet 12 connected to inlet 14 by way of a passage along arrow 16 is depicted. Nozzle 10 includes a discharge portion 13 with structure to provide refined pitch and yaw thrust vectoring. Nozzle 10 has an inlet 14 connected to the outlet 22 of adapter 20. Adapter outlet 22 is connected to adapter inlet 24 by a passage along arrow 16. Inlet 24 is connected to outlet 32 of lift fan 30. Lift fan 30 is vertically mounted along axis V in the fuselage 42 of aircraft 40. Axis V is perpendicular to the direction of travel of the aircraft 40 along the horizontal H axis when in cruise mode. As depicted, lift fan 30 is primarily used for V/STOVL mode operations. Typically, lift fan 30 is indirectly powered by a shaft or other coupling to a separate power source (not shown) of aircraft 40. When in operation, gas at ambient pressure enters the lift fan 30 through intake 34. The pressure of gas received through intake 34 is increased inside the lift fan 30 and exits through outlet 32 at a pressure higher than ambient through adapter 20 and out vectoring nozzle 10. The direction of this pressurized gas or working fluid is changed from the direction upon entering intake 34 as indicated by arrow 16.

Referring next to FIG. 1B, a thrust vectoring nozzle 10 with outlet 12 connected to inlet 14 by way of a passage along arrow 66 is depicted. Nozzle 10 includes a discharge portion 13 with structure to provide refined pitch and yaw thrust vectoring. Nozzle 10 has an inlet 14 connected to the outlet 22 of adapter 20. Adapter outlet 22 is connected to adapter inlet 24 by a passage along arrow 66. Inlet 24 is connected to outlet 62 of gas turbine engine 60. Gas turbine engine 60 is mounted in the fuselage 72 of aircraft 70. Gas turbine engine 60 is horizontally oriented along axis H, the same as the direction of travel of aircraft 70 during cruise mode travel. When in operation, gas at ambient pressure enters the gas turbine engine 60 through intake 64. The pressure of gas received through intake 64 is increased inside the gas turbine engine 60 and exits through outlet 62 at a pressure higher than ambient through adapter 20 and out vectoring nozzle 10. The direction of this pressurized gas or working fluid is changed from the direction upon entering intake 64 as indicated by arrow 66.

For either thrust vectoring system of FIGS. 1A or 1B, it can be appreciated that the direction of working fluid exiting the thrust vectoring nozzle 10 is different than the direction of working fluid entering it. As a result of this change in direction of the working fluid, a thrust component along a vector opposite the direction of working fluid as it exits outlet 12 is accomplished. Furthermore, the discharge portion 13 provides additional capability to selectively direct working fluid exiting outlet 12.

Thrust vectoring systems can be designed which include a variety of working fluid sources. As used herein, a "working fluid source" means any device which provides a pressurized working fluid. Thus, depending on the context, a "working fluid source" may include various adapters, nozzles, hoses, or conduits, as well as a gas turbine engine, lift fan, rocket engine, or other device from which pressurized working fluid emanates. Furthermore, as used herein, "aircraft" includes but is not limited to: vehicles which fly by a fixed or rotary wing, lighter-than-air vehicles, spacecraft which traverse the atmosphere, and hovercraft.

Having generally described the thrust vectoring system orientation with respect to an aircraft, details regarding specific features of the present invention are next discussed. Referring to FIGS. 2 and 3, one embodiment of a thrust vectoring nozzle 100 is depicted. Turning hood 110 is a type of conduit which defines a passage 120 with an outlet 122 and an inlet 124 configured to engage a working fluid source. Turning hood 110 has a pair of opposing side walls 112a and 112b and an arcuate outer wall 114 joining the side walls 112a and 112b. In this embodiment, the opposing side walls 112a and 112b are generally flat and parallel to one another. The basic function of turning hood 110 as shown is to turn working fluid flowing along the passage 120 so that it exits outlet 122 in a direction different than it entered inlet 124.

As shown in FIGS. 2 and 3, turning hood 110 includes a plurality of coupled segments. The segmented nature of turning hood 110 renders it a type of extendable conduit. Specifically, turning hood 110 includes coupled segments 110a through 110f. Each segment of the plurality 110a through 110f has opposing side walls portions which collectively form opposing walls 112a and 112b. The side wall portions of each segment 110a through 110f are joined by a curved outer wall portion which collectively comprises the arcuate outer wall 114. As a result, each segment presents a substantial U-shape viewed in a plane containing the side walls 112a and 112b, and the outer wall 114. In other embodiments, the specific shape of one or more segments may vary. For example, segments may be shaped to have one continuous curved wall. In one variation, the segments are shaped as cylindrical rings.

Figure 3:
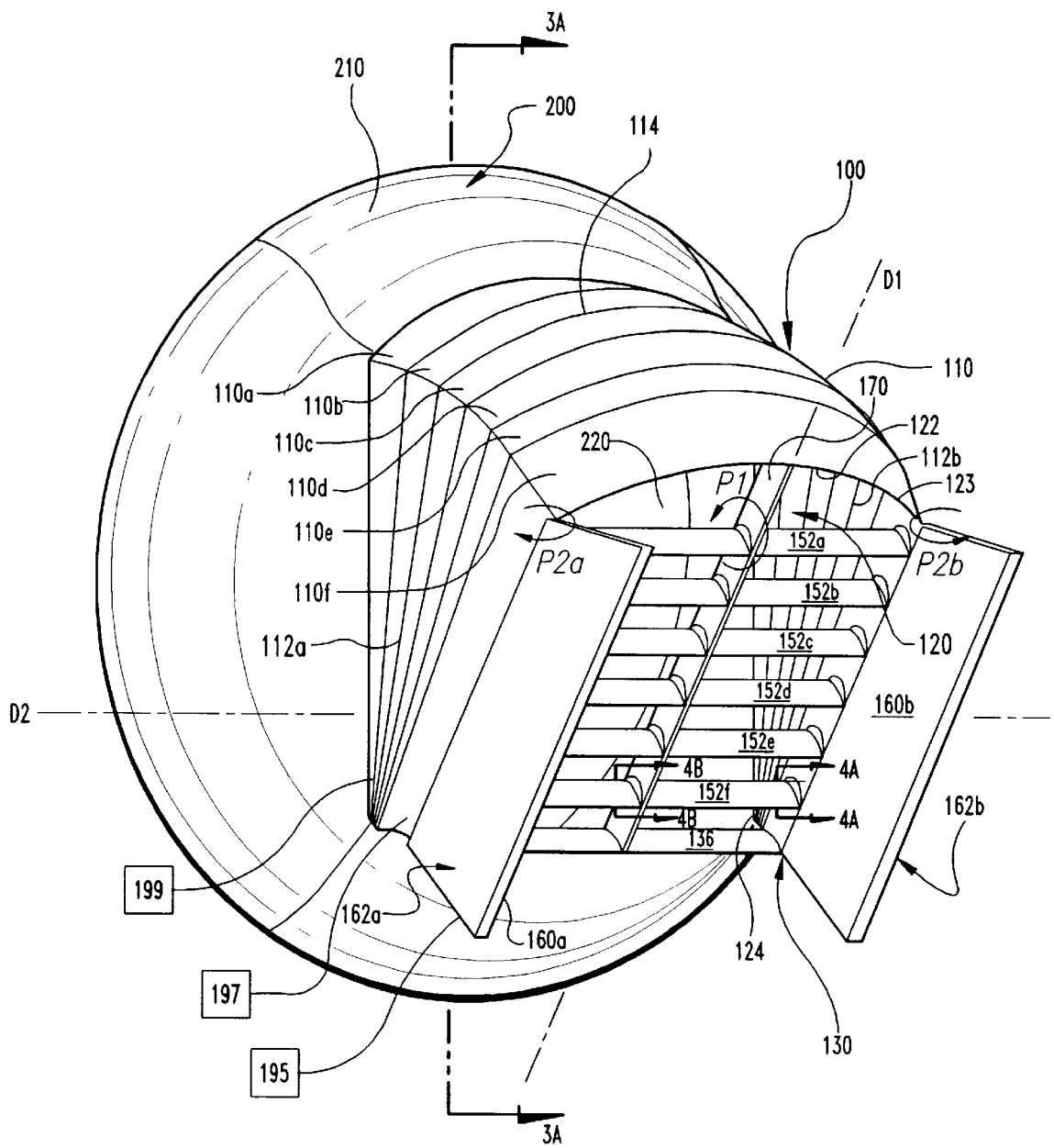
FIG. 3 is a perspective view of the embodiment shown in FIG. 2 with the adapter and nozzle connected.
Figure 3A:
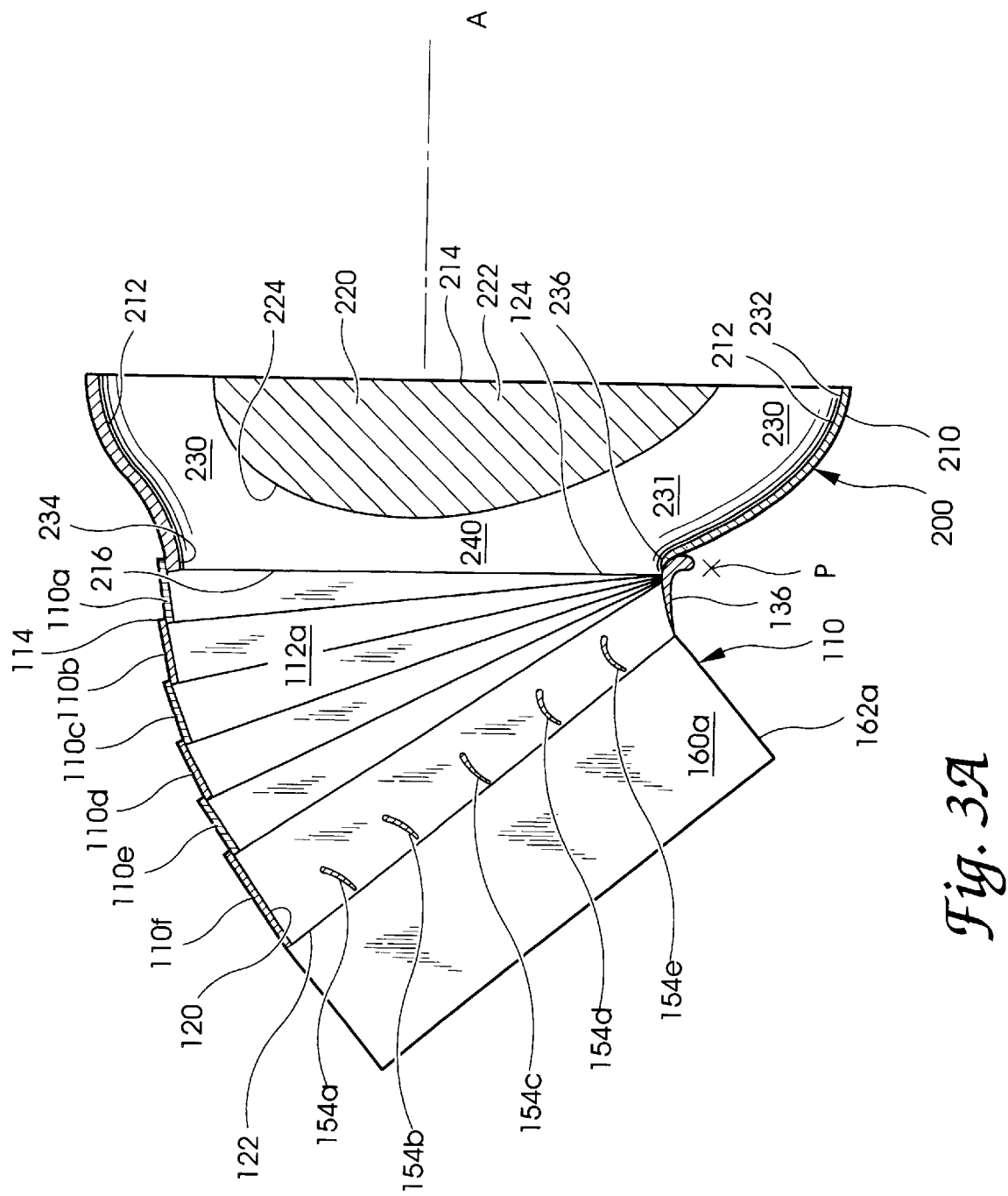
FIG. 3A is a cross-sectional view of the embodiment shown in FIG. 3.

Referring to FIG. 3A, each segment 110a through 110f is coupled to at least one adjacent segment to form a conduit defining passage 120. Segment 110a is the base segment configured to engage a working fluid source. Segment 110f is a discharge segment adjacent outlet 122. Each segment articulates with respect to adjacent segments. Moreover, each segment is configured to nest within at least a portion of an adjacent segment up to the outermost segment, the discharge segment 110f. This arrangement is similar to the arrangement of the segmented turning hoods presented in U.S. Pat. Nos. 3,704,829 to Hall and 3,835,643 to De Garcia, Jr. et al. which are incorporated by reference herein.

Figure 3B:
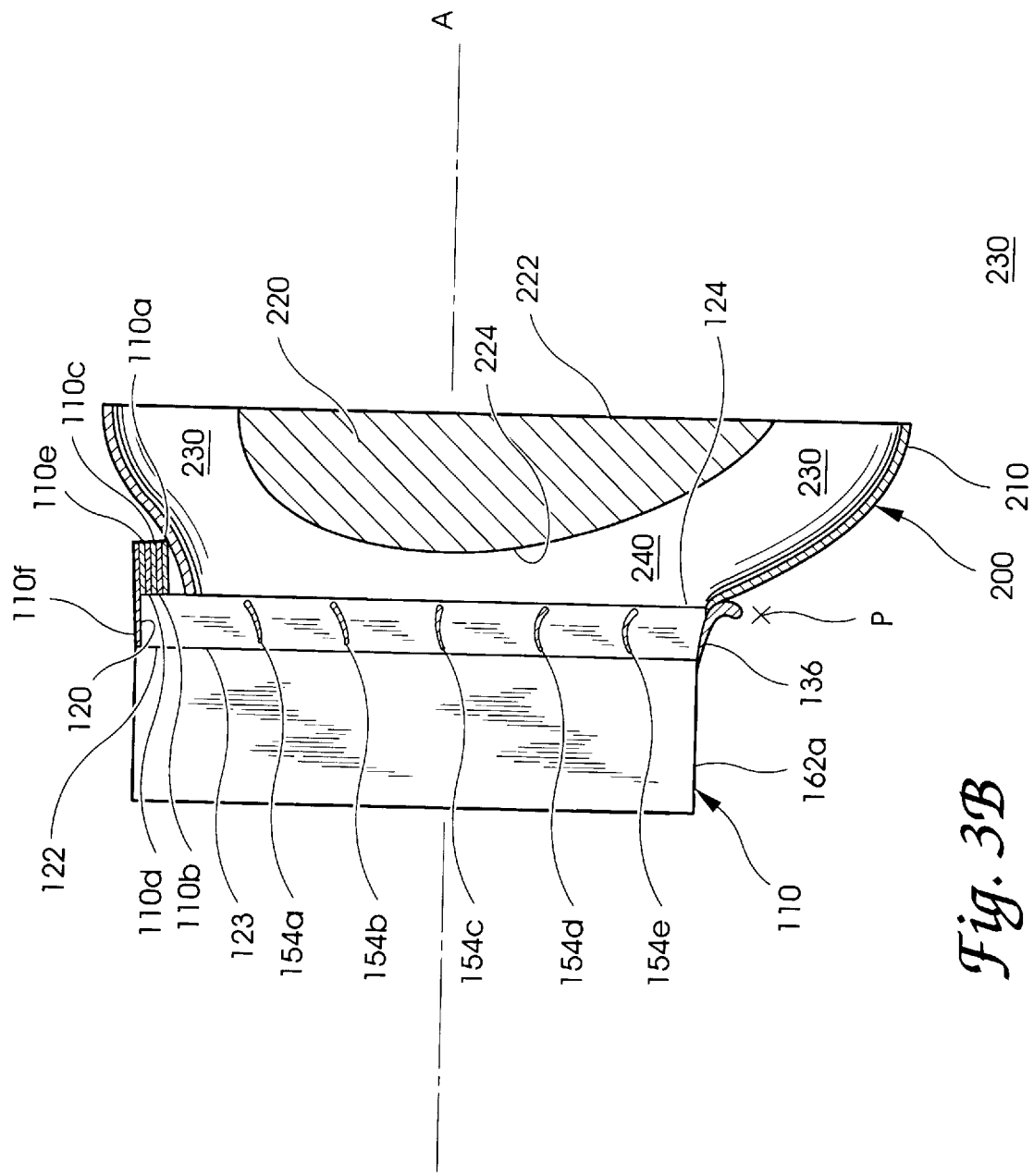
FIG. 3B is a cross-sectional view of the embodiment shown in FIG. 3A with the turning hood in the stowed position.

Having described the structure of turning hood 110, the extendable character of the turning hood 110 and its ability to vector thrust are next considered. As depicted in FIG. 3B, the arrangement of the segments 110a through 110f permits the turning hood 110 to be stowed in an unextended position. In this stowed position, each segment 110a through 110e is nested within an adjacent segment, and all segments 110a through 110e are nested within the discharge segment 110f. The passage 120 in the unextended position is generally straight from inlet 124 to outlet 122. As a result, working fluid exiting outlet 122 is not vectored or turned by the turning hood 110. However, as the segments 110a through 110f move about pivot point P, they become "unnested" or extended.

Referring back to FIG. 3A, turning hood 110 is in a partially extended position. This extended position turns working fluid exiting outlet 122 about 45 degrees from the direction of entry into inlet 124. Each segment 110a through 110f of turning hood 110 spans an angle of about 10 degrees with respect to the pivot point P. As a result, turning hood 110 has a maximum extended position which correspondingly turns working fluid about 60 degrees. In other embodiments, the turning hood may have a different number of segments, or segments with different angular spans in various combinations to create a different extension range.

From the unextended to fully extended position, the segments 110a through 110f are coupled together in the turning hood 110 configuration. This coupling scheme permits adjacent segments to slide past one another when changing from one position to another. Various coupling schemes may be employed as would occur to those of skill in the art. For example, in one embodiment of the present invention, the coupling scheme presented in either U.S. Pat. No. 3,704,829 to Hall or U.S. Pat. No. 3,835,643 to De Garcia, Jr. et al. is used. Coupling of the segments 110a through 110f may include extending side walls 112a and 112b to the pivot point P and joining them with a supporting pin or rod therethrough and/or the use of abutment flanges to link the adjacent edges of the segments. Coupling may include the addition of an inner wall for each segment opposite outer wall 114 to provide a closed conduit wherein the segments extend and retract in a "telescopic" fashion.

Preferably, the degree of extension of the turning hood is continuously controlled. One way to accomplish this continuous control is with the schematically illustrated actuation system 199 shown in FIG. 3. U.S. Pat. Nos. 3,704,829 to Hall and 3,835,643 to De Garcia, Jr. et al. reveal various actuation systems which may be adapted by one of skill in the art to provide an actuation system 199 for the present invention. Furthermore, it can be appreciated orienting vectoring nozzle 100 similar to nozzle 10 in FIGS. 1A and 1B generally provides a way to control pitch of the aircraft by selectively extending or unextending the turning hood 110.

In one embodiment, the segment connected to the working fluid source is the outermost segment and the segment adjacent the outlet in the fully extended position is the innermost segment. In another embodiment, the turning hood is fixed in nature, having no segmented structure at all. Instead, this fixed turning hood embodiment includes a permanent working fluid deflection path which vectors working fluid as it exits the attached working fluid source.

Besides the vectoring capability resulting from selective extension of turning hood 110, further vectoring of working fluid as it exits outlet 122 is made possible by the present invention. As shown in FIG. 3, discharge segment 110f includes discharge portion 130. Discharge portion 130 includes an inner wall 136 opposite the outer wall 114. Inner wall 136 has a longitudinal axis positioned generally perpendicular to the flat side walls 112a and 112b. Inner wall 136 closes the segment 110f to form a D-shaped outlet. Also, inner wall 136 is shaped so that it at least partially closes the portion of the conduit formed by segments 110a through 110e. In other embodiments, the inner wall may be absent or only close selected portions of the conduit. In still other embodiments, the outer wall 114 may be moveable to vary the exit area of the outlet. For example, the area can be increased while extending the hood.

Mounted to the discharge portion 130 are several directing members adjacent outlet 122 for further directing working fluid exiting the outlet 122. Specifically, directing members of the present invention variably and controllably impart a directional component to working fluid exiting outlet 122 by changing the position of a directing surface of the directing member. The directing surface comes in contact with the working fluid to be redirected, and controllably and selectively blocks or deflects its flow. Movement of the directing surface of a directing member is relative to a conduit or hood forming the passage. As a result, vectoring by movement of a directing member avoids adjusting the turning hood or conduit shape. For turning hood 110, secondary or refined vectoring with directing members is accomplished without moving any of the segments 110a through 110f. Moreover, vectoring by directing members is possible for any given extension position of turning hood 110.

Guide vanes 152a through 152f are shown as directing members. Each guide vane 152a through 152f is mounted in passage 120 and has opposing ends with a longitudinal axis along its length from side wall 112a to side wall 112b, and a transverse axis along its width perpendicular to the longitudinal axis going from the outlet 122 to the inlet 124. The longitudinal axis of each guide vane 152a through 152f is approximately perpendicular to each flat side wall 112a and 112b. The longitudinal axis of each guide vane 152a through 152f is approximately parallel to the longitudinal axis of every other guide vane 152a through 152f, and each guide vane 152a through 152f is about evenly spaced apart from an adjacent member.

So configured, guide vanes 152a through 152f form a cascade guide vane bank. A central support strut 170 is used to dampen vibration and increase stability. In other embodiments having a cascade guide vane bank, this support strut is positioned differently or is absent. Although FIG. 3 reveals six guide vanes 152, other embodiments may employ more or less guide vanes. Still other embodiments may only employ a single guide vane mounted in the conduit passage adjacent the outlet. Referring to the cross-sectional views of FIGS. 3A and 3B, only five guide vanes 154a through 154e are shown, and the central support strut 170 is absent. As the cross-sectional views illustrate, each of guide vane has an airfoil shape. Similarly, the guide vanes 152 are envisioned with an airfoil shape although other embodiments may have guide vanes of various other shapes. The curvature of each guide vane 154 is different. The curvature of guide vane 154e adjacent inner wall 136 is the greatest. The degree of curvature of a given guide vane necessary to maximize efficiency of a given vectoring nozzle depends on several factors including the position of the guide vane, the number of other guide vanes, the geometry of the vectoring nozzle, and the geometry of the working fluid source to which the vectoring nozzle is attached.

Also, FIGS. 3A and 3B reveal the curved airfoil structure of inner wall 136. It can be appreciated that inner wall 136 moves along with the discharge segment 110f, effectively pivoting about the pivot point P to maintain a substantially closed conduit as a comparison of the relative position of inner wall 136 in FIG. 3A to FIG. 3B shows. In another embodiment, the inner wall is absent or the conduit is only partially closed.

Next referring to the cross-sectional views of FIGS. 4A and 4B, the change of curvature along the longitudinal axis of guide vane 152f of FIG. 3 is illustrated. FIG. 4A illustrates the curvature of guide vane 152f with opposing directing surfaces 150f and 151f at an end adjacent side wall 112b. FIG. 4B illustrates the amount of curvature near the midpoint between the opposing ends of guide vane 152f. Similarly, for each guide vane 152a through 152f, the curvature of the opposing surfaces changes from an end of a given guide vane to the midpoint. The degree of change of a given guide vane necessary to maximize efficiency of a given vectoring nozzle depends on several factors including the position of the guide vane, the number of other guide vanes, the geometry of the vectoring nozzle, and the geometry of the working fluid source to which the vectoring nozzle is attached. Generally, the guide vanes 152a through 152f are symmetric about a plane perpendicular to the longitudinal axis of the guide vane and between the opposing ends. The plane of symmetry between the opposing ends and perpendicular to the longitudinal axis also includes the midpoint.

Referring back to FIG. 3, various functional aspects of guide vanes are discussed. In one embodiment, each guide vane 152a through 152f pivots about its longitudinal axis as representatively depicted by pivot path P1 for guide vane 152a. It is envisioned that the pivot position of each guide vane 152a through 152f may be controlled by an actuation system 197 as schematically shown. One embodiment of this actuation system 197 positions each guide vane 152a through 152f independently of the others. In other embodiments, the position guide vanes 152a through 152f may be fixed or the position may only be changed in tandem. In any case, it is envisioned that any actuation system 197 could be used as would occur to one of skill in the art.

For guide vanes 152a through 152f, a controllable amount of deflection of working fluid exiting outlet 122 along lateral axis D1 can be selected. In the embodiment illustrated, the amount of deflection along D1 varies with the position of each of the guide vane 152a through 152f. Specifically, as the pivot position changes for a guide vane, the amount of deflection along D1 caused by the newly positioned guide vane changes due to the position of the directing surfaces of the guide vanes relative to the conduit passage 120. In one embodiment of the present invention, guide vanes 152 add an additional 20 degrees of pitch control.

Other directing members are depicted as opposing doors 162a and 162b. Door 162a has a directing surface 160a and door 162b has a directing surface 160b. The directing surfaces 160a and 160b are generally flat, and are configured for contact with the working fluid. Doors 162a and 162b are mounted adjacent the outlet 122 and are connected to the vectoring nozzle 100. Door 162a aligns with side wall 112a and door 162b aligns with side wall 112b.

The function of the doors 162a and 162b is now discussed. Each door pivots about a portion of the rim 123 of outlet 122 as representatively shown by the pivot paths P2a and P2b. The doors 162a and 162b are used to selectively direct working fluid exiting the vectoring nozzle along the D2 axis. Similar to the turning hood 110 and the guide vanes 152, an actuation system 195 is schematically shown to selectively position the doors 162a and 162b.

When working fluid under pressure exits an outlet into an ambient environment, a portion of the working fluid diverges; however, the working fluid diverges equally in opposite directions so that no directional component along axis D1 or D2 results. FIGS. 5A, 5B and 5C provide a top plan view of the doors of turning hood 110. Referring to FIG. 5A, no net divergence of working fluid along axis D2 occurs because doors 162a and 162b are positioned at the same relative pivot angle to the outlet.

However, as shown in FIG. 5B, when doors 162a and 162b are pivoted in tandem, a directional component of working fluid emerging from outlet 122 along axis D2 results due to the new position of the generally parallel directing surfaces 160a and 160b relative to the passage. Specifically, door 160a is pivoted inward and door 160b is pivoted outward with respect to outlet 122. This tandem positioning of the pair of doors 160a and 160b provides the advantage of a generally constant working fluid exit area which results in more efficient performance of the system. Alternatively, when a uniform working fluid exit area is not required, a D2 directional component can be provided by moving one of opposing doors 162a and 162b inward or outward substantially more than the other. In either case, the ability to direct fluid along the D2 axis varies with the geometry and position of the directing surfaces 160a and 160b relative to the position of the passage 120.

In the embodiment shown in FIG. 5C, another position of doors 162a and 162b is shown. In this position, doors 162a and 162b are pivoted to cover at least a portion of outlet 122 which is ideal for stowing the nozzle 100.

Other embodiments use a single door. Also, one or more doors may be used which do not pivot, but instead slide generally parallel and adjacent the vectoring nozzle wall. In another variation involving a door, the discharge portion includes a wall which defines a side opening with a door mounted therein. Furthermore, in other embodiments, the number and orientation of the door or doors can vary, and one or more doors may be used adjacent an outlet which does not include a guide vane.

As illustrated by the previous embodiments including guide vanes and doors, a directing member is a structure mounted to the conduit of a vectoring nozzle adjacent an outlet which controllably and selectively provides additional vectoring capability. In each case, the directing member has a directing surface configured to come in contact with the working fluid to be redirected. The directing member imparts a directional vector to working fluid by changing the position of a directing surface relative to the passage of the vectoring nozzle.

Preferred embodiments of the present invention having a directing member include a guide vane, flap, slat, or blade as a directing member. For example, a guide vane mounted in the passage of a conduit adjacent the outlet to further direct working fluid passing through the outlet is a preferred embodiment employing a directing member. Similarly, a guide vane mounted to the discharge segment of a segmented turning hood is a preferred embodiment.

Another preferred embodiment includes a door as a directing member having a directing surface to contact and further direct working fluid passing through the passage of the conduit. The door may be mounted to the conduit so that it pivots about a rim of the outlet or may occupy a side opening in the wall of the conduit. In either case, the directing surface selectively controls the amount of lateral divergence of at least a portion of the working fluid from the conduit.

A more preferred embodiment employing directing members includes a guide vane with an airfoil shape having opposing directing surfaces configured to contact and further direct the working fluid. In another more preferred embodiment, the guide vane has a curvature of the opposing directing surfaces which varies along its length.

In still another more preferred embodiment, multiple guide vanes are used. In one variation of this more preferred embodiment, multiple guide vanes are aligned so each has a longitudinal axis parallel to the longitudinal axis of another and each is evenly spaced apart to form a cascade guide vane bank. The cascade guide vane bank is mounted in the passage of a conduit or adjustable hood close to the outlet. For the segmented turning hood, the cascade guide vane bank would preferably be mounted to the discharge segment. In one variation, each of the guide vanes in the cascade guide vane bank includes a curvature unique to its position in the passage.

Also, having a pair of opposing doors as directing members is a more preferred embodiment of the present invention. The pair of opposing doors are configured to correspondingly align with opposing walls of the conduit, and permit tandem movement which substantially maintains a constant exit area. The pair of doors can be configured to substantially cover the outlet when the extendable conduit is in the stowed position.

In yet another aspect of the present invention, the thrust vectoring system includes a first directing member mounted to the discharge portion adjacent the outlet which is oriented to selectively impart a directional component to working fluid exiting the outlet along a first axis lateral to the outlet. In this context, an axis "lateral to the outlet" means an axis that is approximately parallel to a plane containing the exit area of the outlet. Also, the thrust vectoring system includes a second directing member mounted to the discharge portion adjacent the outlet which is oriented to selectively impart a directional component to working fluid exiting the outlet along a second axis lateral to the outlet. This second axis is substantially different from the first axis. Directing members so oriented substantially provide a secondary vectoring capability along any direction in a plane containing the area of the outlet in addition to the primary vectoring available from positioning the outlet of the conduit or turning hood. Directing members oriented in this fashion comprise a more preferred embodiment of the present invention.

The most preferred embodiment of the present invention having directing members includes a cascade guide vane bank combined with opposing doors as directing members. In this most preferred embodiment, the directing members are oriented so that each guide vane selectively imparts a directional component along a first axis lateral to the outlet and the doors impart a directional component along a second axis lateral to the outlet and substantially different from the first axis.

Besides a segmented turning hood, in another embodiment directing members are mounted to an extendable conduit or adjustable hood such as hoses made from a flexible material with a collapsible "accordion" wall to accommodate various curved shapes. Other types of extendable conduits include a living hinge material. Alternatively, an extendable conduit may be comprised of a series of pivotally hinged walls.

The conduit may be a cylindrical tube with a continuous curved wall. Still other embodiments have a fixed deflection passage such as a fixed turning hood. This configuration may be comprised of a single curved shell or tube which cannot be moved or reshaped. In one embodiment it is envisioned, that a fixed turning hood may be configured with a discharge portion having one or more directing members to further direct working fluid as it exits.

Another aspect of the present invention is a working fluid source adapter to improve efficiency of the thrust vectoring system. Referring to FIGS. 2, 3, 3A and 3B; an adapter 200 is illustrated. Adapter 200 provides a way to efficiently redirect the working fluid from an approximately annular shaped outlet of a working fluid source into the passage of a vectoring nozzle. In addition, adapter 200 is configured to minimize flow separation as the working fluid is redirected. Adapter 200 has a shroud 210 at least partially enclosing a centerbody 220 configured to connect to a working fluid source. Alternatively, adapter 200 may be considered a part of a working fluid source when already so connected.

In FIG. 3A, the adapter 200 is shown connected to the thrust vectoring nozzle 100. The shroud 210 of adapter 200 has a surface 212 defining an opening 232 at a first end 214 and an aperture 234 at a second end 216 opposing the first end 214. The aperture 234 has a smaller cross-sectional area than the opening 232 of shroud 210. Opening 232 cooperates with centerbody 220 to form passage 230 to receive working fluid from a working fluid source, and aperture 234 is configured to engage the inlet 124 of the turning hood 110.

Referring to FIG. 2, aperture 234 has a D-shape corresponding to the shape of passage 120 formed by the turning hood 110. Furthermore, centerbody 220 is enclosed within the hollow outerbody 210 revealing a head 224.

Figure 2A:
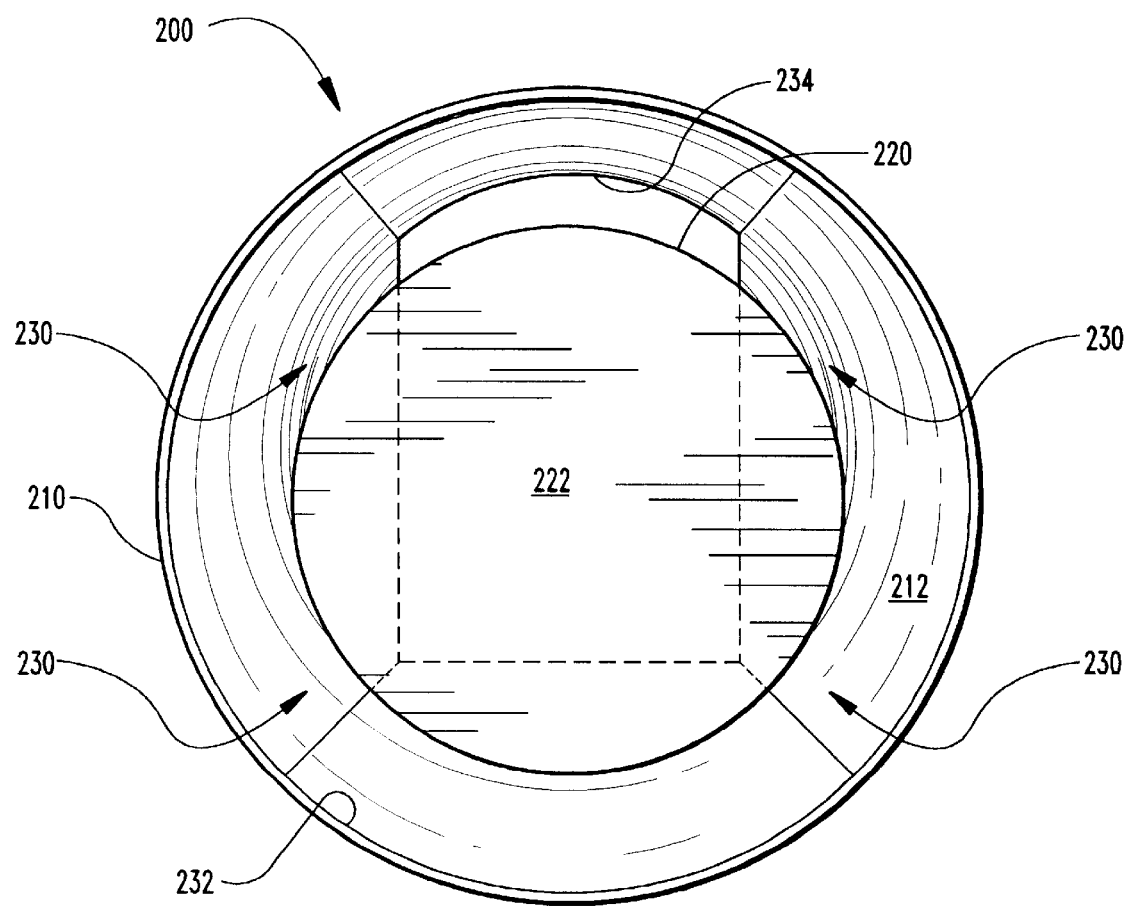
FIG. 2A is a rear elevational view of the adapter shown in FIG. 2.

Next referring to FIG. 2A which shows a rear elevational view of the adapter shown in FIG. 2., a base 222 is observed opposite the head 224. The base 222 cooperates with the opening 232 to lend an annular shape to passage 230 which circumscribes the base 222. Base 222 is configured to connect to a working fluid source such as lift fan. In other embodiments, adapter passage 230 only circumscribes a portion of base 222. In either case, the adapter passage 230 intersects opening 232.

Referring again to the cross-sectional view of FIG. 3A, head 224 is spaced apart from the surface 212 at the second end 216 to define a chamber 240 intersecting the adapter passage 230. As a result, working fluid from a working fluid source enters opening 232, passes through adapter passage 230, converges in chamber 240 and exits through aperture 234 with lip 236. Notably, lip 236 is shaped to engage the inner wall 136 and maintain substantial closure of the conduit. Specifically, the shape of lip 236 in cooperation with inner wall 136 maintains closure for the various pivot positions of inner wall 136 corresponding to the range of extension positions of turning hood 110.

Figure 6:
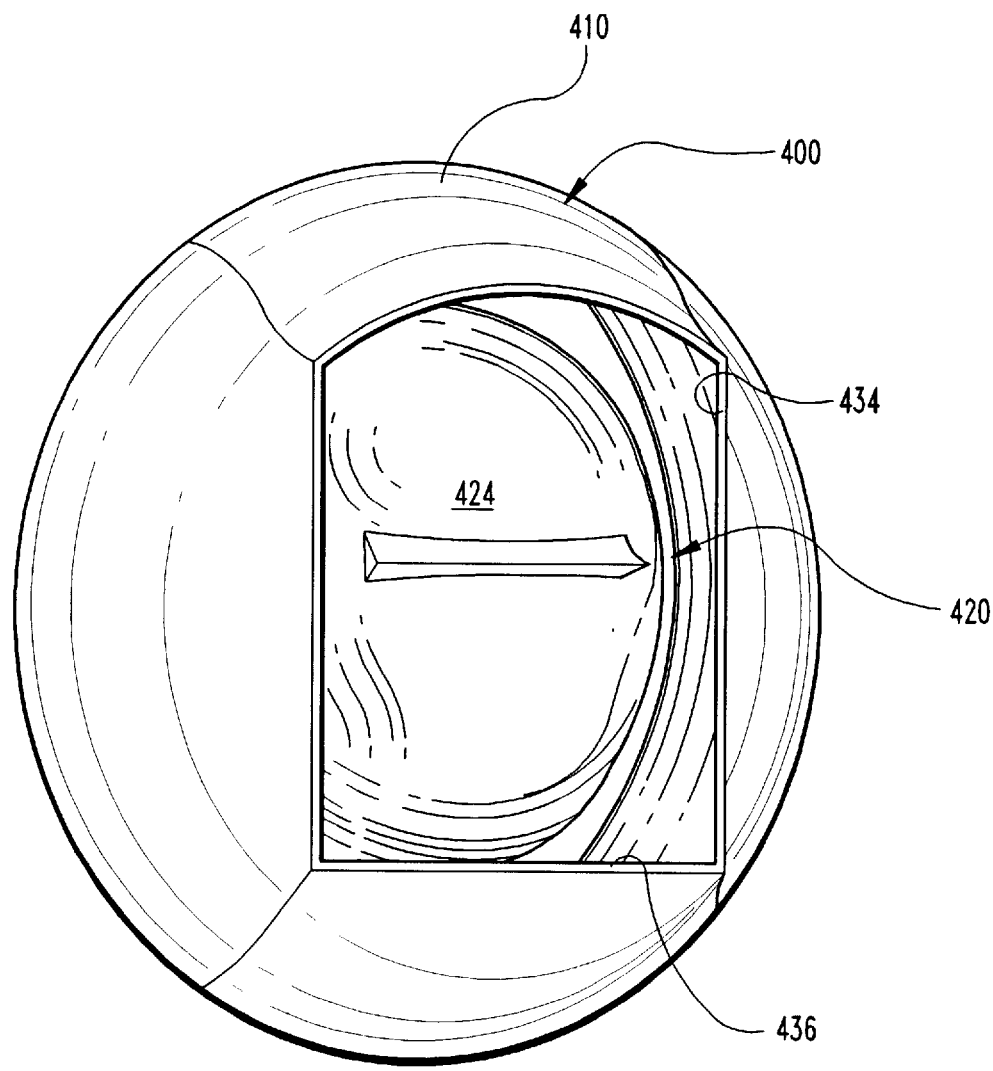
FIG. 6 is a perspective view of an alternative embodiment of the working fluid source adapter of the present invention.

It should be noted that head 224 has an asymmetric shape with respect to axis A. In this embodiment, this asymmetric shape is continuous. In other embodiments, a discontinuous "whale tail" shape is used as illustrated for head 424 of adapter 400 in FIGS. 6 and 7. Similar to adapter 200, adapter 400 provides an efficient way to redirect working fluid from a working fluid source with an annular outlet into an aperture 434 configured to efficiently supply working fluid to a vectoring nozzle. The base and hollow body 410 of adapter 400 cooperate in substantially the same way forming generally the same configuration as depicted in in FIG. 2A.

Referring back to FIG. 3A, it should also be noted that adapter passages 230 include region 231 opposite the outer wall 114 of the turning hood 110 bounding the passage 120 when in the curved extended position. The asymmetric shape of head 224 directs working fluid emerging from region 231 toward outer wall 114 of turning hood 110. This directional effect decreases flow separation when adapter 200 is connected to thrust vectoring nozzle 100. Similarly, as shown in FIG. 7, working fluid emerging from adapter passage region 431 is directed by the asymmetric head 424 toward outer wall 114 or turning hood 110.

Figure 7:
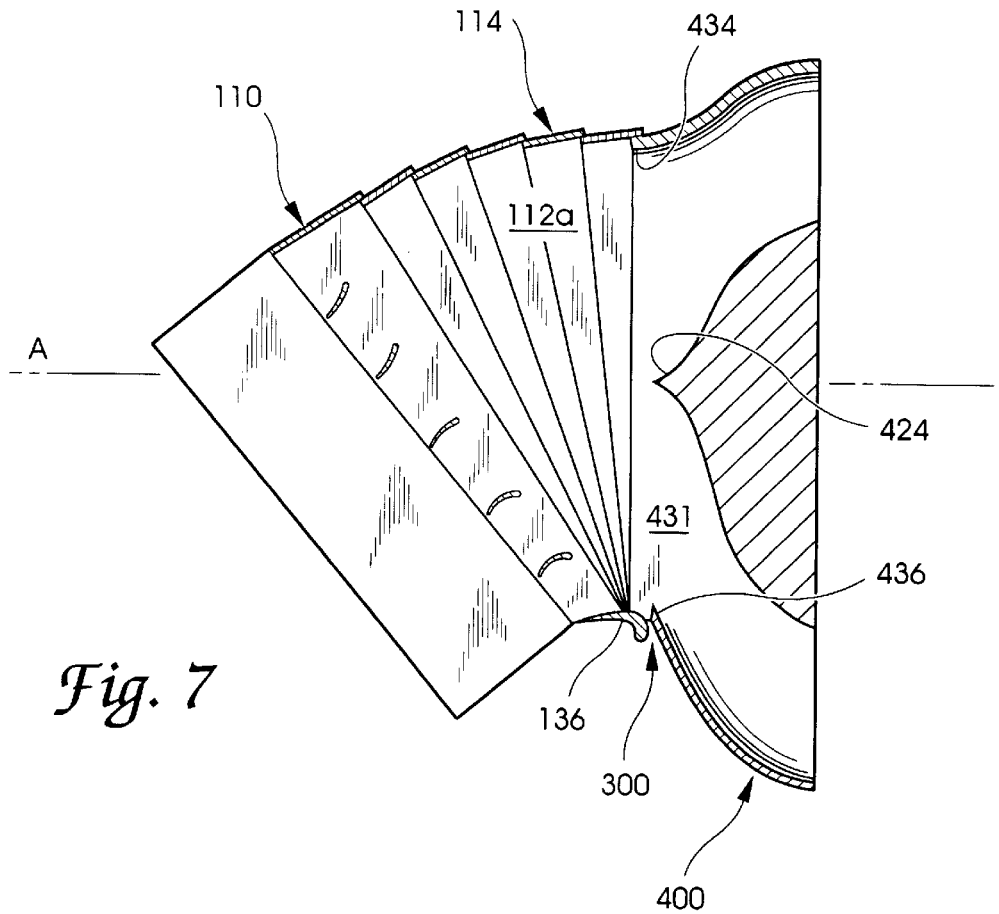
FIG. 7 is a cross-sectional view of an alternative embodiment of the vectoring nozzle and working fluid source adapter of the present invention.
Figure 8:
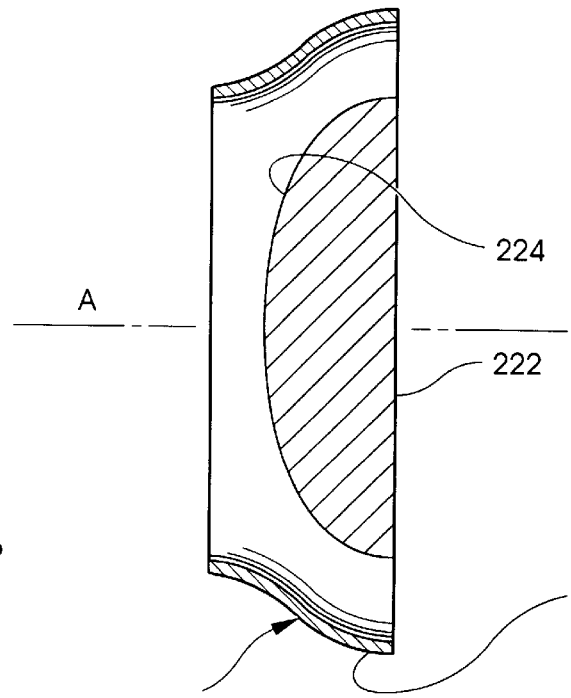
FIG. 8 is a cross-sectional view of the adapter of FIG. 2 taken on a plane normal to the cross-sectional plane shown in FIG. 3A and 3B.

For either head 224 and 424, a plane of symmetry exists which is perpendicular to the plane of the cross-sectional views of FIGS. 3A, 3B, and 7. This plane of symmetry is generally parallel to the side walls of turning hood 110 when attached to the adapter. Specifically, the symmetry of head 224 about this plane is illustrated in FIG. 8. Likewise, head 424 is symmetric, although the specific contours of adapter 400 differ slightly from the contours of adapter 200 shown in FIG. 8. A comparison of the perspective illustrations of adapters 200 and 400 in FIGS. 2 and 6, respectively, reveals these minor differences. In other embodiments, the head lacks symmetry about all planes.

Referring to FIG. 3B, it should be noted that in the stowed position, segments 110a through 110e are situated along shroud 210 of adapter 200 to minimize interference with the movement of directing members, especially the guide vanes. Similarly, directing member movement interference is minimized by this structure as the turning hood 110 is extended. In another embodiment, one or more segments 110a through 110e may at least partially be enclosed in the discharge portion 130 when the turning hood 110 is in a less than fully extended position. To provide for pivoting of the guide vanes of the discharge portion in this embodiment, slots in the side walls are envisioned.

In another aspect of the present invention, venting to reduce flow separation is contemplated. When a curved deflection path is used to vector working fluid such as turning hood 110, a static pressure differential exists between the outer radius and inner radius of the curved passage. This pressure differential gives rise to flow separation or "dead zones" along the inner bend of the curved passage. One embodiment of the present invention which employs venting is depicted in FIG. 7. In this embodiment, inner wall 136 of discharge portion 130, lip 436 of adapter 400, and the side walls 112a and 112b cooperate to define vent 300. Working fluid in region 431 adjacent lip 436 has a relatively high static pressure which, when vented by vent 300, provides an effective method to reduce "dead zones" and flow separation of the working fluid as it passes through the adapter. Notably, lip 436 is modified in comparison to lip 236 of adapter 200 to maximize the benefit of the venting. Specifically, the lip 436 is not shaped to engage inner wall 136, but rather has a sharply slanted configuration to form the vent opening. In another embodiment, the inner wall 136 is removed creating an open conduit with a larger inner vent.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thrust vectoring system, comprising:
   an aircraft;
   a working fluid source mounted to said aircraft;
   an extendable conduit defining a passage from an inlet to an outlet, said inlet being connected to said working fluid source;
   said passage being adjustably shaped so that the direction of the working fluid exiting said outlet is different than the direction of the working fluid entering said inlet when said conduit is extended;
   said passage being generally straight when said conduit is unextended;
   a first guide vane mounted in said passage adjacent said outlet to further direct the working fluid passing through said outlet, said first guide vane being selectively movable to change thrust direction when said conduit is generally unextended.

2. The thrust vectoring system of claim 1, further comprising a directing member mounted to said extendable conduit adjacent said outlet.

3. The thrust vectoring system of claim 2, wherein said directing member is a second guide vane.

4. The thrust vectoring system of claim 3, wherein:
   said first guide vane has a first pair of opposing directing surfaces with a first curvature;
   said second guide vane has a second pair of opposing directing surfaces with a second curvature, said first curvature being greater than said second curvature.

5. The thrust vectoring system of claim 2, wherein:
   said first guide vane is oriented to selectively impart a directional component to the working fluid exiting said outlet along a first axis lateral to said outlet;
   said directing member is oriented to selectively impart a directional component to the working fluid exiting said outlet along a second axis lateral to said outlet and substantially different from said first axis.

6. The thrust vectoring system of claim 5, wherein said directing member is a door having a directing surface to contact and further direct working fluid flowing through said passage.

7. The thrust vectoring system of claim 5, wherein said directing member is a second guide vane.

8. The thrust vectoring system of claim 1, wherein:
said conduit includes a pair of opposing walls adjacent said passage, each of said pair of walls being generally parallel to the other;
said first guide vane is mounted between said pair of walls, said guide vane having a longitudinal axis generally perpendicular to said pair of walls.

9. The thrust vectoring system of claim 1, wherein said first guide vane has an airfoil shape.

10. The thrust vectoring system of claim 9, wherein said first guide vane has opposing ends along a longitudinal axis, and said first guide vane has a pair of opposing directing surfaces, said pair of opposing directing surfaces having:
a first curvature near a midpoint between said opposing ends;
a second curvature at one of said opposing ends, said first curvature being greater than said second curvature.

11. The thrust vectoring system of claim 10, wherein said first guide vane is symmetric about a plane between said opposing ends and perpendicular to an axis along the length of said first guide vane.

12. The thrust vectoring system of claim 1, further comprising a plurality of directing members.

13. The thrust vectoring system of claim 12, wherein said plurality of directing members includes at least a second guide vane and a third guide vane selectively movable to change thrust direction.

14. The thrust vectoring system of claim 12, wherein each member of said plurality of guide vanes is mounted with a longitudinal axis approximately parallel to every other member of said plurality of guide vanes.

15. The thrust vectoring system of claim 14, wherein each member of said plurality of guide vanes is about evenly spaced apart from an adjacent member.

16. A thrust vectoring system, comprising:
an aircraft;
a working fluid source mounted to said aircraft;
an extendable conduit having a plurality of coupled segments including:
a base segment connected to said working fluid source;
a discharge segment adjacent said outlet;
said passage being adjustable so that the direction of the working fluid exiting said outlet is different than the direction of the working fluid entering said inlet when said conduit is extended;
said passage being generally straight when said conduit is unextended;
at least one member of said plurality of coupled segments being configured to nest within at least a portion of an adjacent member when said conduit is unextended;
a first directing member mounted to said discharge segment adjacent said outlet to further direct the working fluid exiting said outlet, said first directing member being movable to controllably change thrust direction when said conduit is generally unextended.

17. The thrust vectoring system of claim 16, wherein said first directing member is a door having a directing surface to contact and further direct working fluid flowing through said passage.

18. The thrust vectoring system of claim 17, wherein said outlet includes a rim and said door pivots about a portion of said rim.

19. The thrust vectoring system of claim 16, wherein said first directing member is a guide vane mounted in said passage.

20. The thrust vectoring system of claim 16, further comprising a second directing member.

21. The thrust vectoring system of claim 20, wherein:
said first directing member is oriented to selectively impart a directional component to the working fluid exiting said outlet along a first axis lateral to said outlet;
said second directing member is oriented to selectively impart a directional component to the working fluid exiting said outlet along a second axis lateral to said outlet, said second axis being substantially different from said first axis.

22. The thrust vectoring system of claim 20, wherein:
said first directing member is a first door having a first directing surface to contact and further direct working fluid flowing through said passage;
said second directing member is a second door having a second directing surface to contact and further direct working fluid flowing through said passage.

23. The thrust vectoring system of claim 22, wherein said first and second doors cooperate to provide a closed position covering at least a portion of said outlet.

24. The thrust vectoring system of claim 22, wherein said outlet has a rim, and each of said first and second doors pivot about a portion of said rim.

25. The thrust vectoring system of claim 22, wherein said first door opposes said second door.

26. The thrust vectoring system of claim 16, further comprising a plurality of directing members mounted to said discharge segment adjacent said outlet, said plurality of directing members being selectively movable to change thrust direction and including said first directing member.

27. The thrust vectoring system of claim 26, wherein said plurality of directing members includes:
a pair of opposing doors, each member of said pair of opposing doors, each member of said pair of opposing doors having a directing surface to contact and further direct working fluid flowing through said passage;
a number of guide vanes, each member of said number of guide vanes having a longitudinal axis approximately parallel to the longitudinal axis of each other member of said number of guide vanes.

28. The thrust vectoring system of claim 27, wherein:
said pair of opposing doors are oriented to selectively impart a directional component to the working fluid exiting said outlet along a first axis lateral to said outlet;
said number of guide vanes are oriented to selectively impart a directional component to the working fluid exiting said outlet along a second axis lateral to said outlet and substantially different from said first axis.

29. The thrust vectoring system of claim 16, wherein said discharge segment includes a first wall and a second wall, said first and second walls being approximately parallel to each other.

30. The thrust vectoring system of claim 29, wherein said first and second walls are joined by an arcuate outer wall.

31. The thrust vectoring system of claim 30, wherein said discharge segment includes an inner wall opposing said outer wall, said inner wall being mounted between said first and second walls so that said outlet has a D-shape.

32. The thrust vectoring system of claim 31, wherein said inner wall has an airfoil shape.

33. A thrust vectoring system, comprising:
an aircraft;
a working fluid source mounted to said aircraft;
an extendable conduit defining a passage from an inlet to an outlet, said inlet being connected to said working fluid source;

said passage being adjustable so that the direction of working fluid exiting said outlet is different than the direction of the working fluid entering said inlet;

a first directing member mounted to said extendable conduit adjacent said outlet, said first directing member being oriented to selectively impart a directional component to the working fluid exiting said outlet along a first axis lateral to said outlet;

a second directing member mounted to said extendable conduit adjacent said outlet, said second directing member being oriented to selectively impart a directional component to the working fluid exiting said outlet along a second axis lateral to said outlet and substantially different from said first axis.

34. The thrust vectoring system of claim 33, wherein said first directing member is a first door having a first directing surface to contact and further direct working fluid flowing through said passage.

35. The thrust vectoring system of claim 34, further comprising a second door having a second directing surface to contact and further direct working fluid flowing through said passage.

36. The thrust vectoring system of claim 34, wherein said second directing member is a first guide vane.

37. The thrust vectoring system of claim 36, further comprising a second guide vane mounted to said extendable conduit.

38. The thrust vectoring system of claim 33, further comprising a third directing member mounted to said extendable conduit adjacent said outlet.

39. A thrust vectoring system, comprising:
an aircraft;
a working fluid source mounted to said aircraft;
a vectoring nozzle;
a shroud with a surface defining:
an opening at a first end;
an aperture at a second end opposing said first end, said aperture having a smaller cross-sectional area than said opening, said aperture being connected to said vectoring nozzle;
a centerbody with at least a portion enclosed within the interior of said shroud, having:
a base connected to said working fluid source, said base spaced apart from said surface to define an adapter passage therebetween for receiving the working fluid, said adapter passage being formed to circumscribe at least a portion of said base;
a head formed on an end opposite said base, said head spaced apart from said surface at said second end to form a chamber therebetween, said chamber intersecting said aperture and said adapter passage, said chamber being formed to converge working fluid flowing from said adapter passage toward said aperture;
said head having an asymmetric shape to decrease flow separation of working fluid flowing from said adapter passage, through said chamber and out said aperture.

40. The thrust vectoring system of claim 39, wherein said head is shaped in a whale tail.

41. The thrust vectoring system of claim 39, wherein said opening at said first end is generally annular.

42. The thrust vectoring system of claim 39, wherein said aperture has a D-shape.

43. The thrust vectoring system of claim 39, wherein said vectoring nozzle is a turning hood defining a curved working fluid passage bounded by a curved outer wall.

44. The thrust vectoring system of claim 43, wherein said head cooperates with said shroud to form said chamber so that working fluid passing from a portion of said adapter passage opposite said curved outer wall and exiting through said aperture is directed toward said curved outer wall.

45. The thrust vectoring system of claim 43, wherein said aperture and said turning hood are configured to define a vent opposite said outer wall to reduce flow separation.

46. The thrust vectoring system of claim 39, wherein said vectoring nozzle includes:
an extendable conduit defining a passage from an inlet to an outlet, said inlet being configured to receive working fluid;
said passage being adjustable so that the direction of working fluid exiting said outlet is different than the direction of working fluid entering said inlet when said conduit is extended;
said passage being generally straight when said conduit is unextended.

47. The thrust vectoring system of claim 46, further comprising a directing member mounted to said conduit adjacent said outlet, said directing member to further direct working fluid exiting said outlet.

48. The thrust vectoring system of claim 47, wherein said directing member is a guide vane mounted in said passage.

49. The thrust vectoring system of claim 47, wherein said directing member is a door having a directing surface to contact and further direct working fluid passing through said passage.

50. The thrust vectoring system of claim 46, further comprising:
a first directing member mounted to said extendable conduit adjacent said outlet, said first directing member being oriented to selectively impart a directional component to working fluid exiting said outlet along a first axis lateral to said outlet;
a second directing member mounted to said extendable conduit adjacent said outlet, said second directing member being oriented to selectively impart a directional component to working fluid exiting said outlet along a second axis lateral to said outlet and substantially different from said first axis.

51. A method of vectoring thrust, comprising the steps of:
providing an extendable conduit with an inlet connected to a working fluid source, said conduit defining a passage from said inlet to an outlet;
providing working fluid from said working fluid source so that working fluid flows through said passage from said outlet to said inlet;
establishing a first thrust direction by extending said conduit and adjusting said passage so that the direction of working fluid exiting said outlet is different than the direction of working fluid entering said inlet;
changing from said first thrust direction to a second thrust direction by positioning a guide vane mounted in said passage adjacent said outlet to deflect working fluid as it passes through said outlet.

52. The method of vectoring thrust of claim 51, further comprising the step of changing from the second thrust direction to a third thrust direction by positioning a door aligned with a wall of said conduit adjacent said outlet, said door having a directing surface to contact and further direct working fluid passing through said passage.

53. The method of vectoring thrust of claim 51, further comprising the step of stowing said extendable conduit so that said passage is generally straight.

54. The method of vectoring thrust of claim 51, further comprising the step of changing from the second thrust direction to a third thrust direction by positioning a pair of opposing doors in tandem, each of said pair of opposing doors being mounted to said conduit adjacent said outlet in alignment with a wall of said conduit and having a directing surface to contact and further direct working fluid passing through said passage.

55. The method of vectoring thrust of claim 54, further comprising the step of stowing said extendable conduit so that said passage is generally straight.

56. The method of vectoring thrust of claim 55, further comprising the step of changing from the second thrust direction to a third thrust direction by repositioning said guide vane.

57. The method of vectoring thrust of claim 51, wherein said extendable conduit has a plurality of coupled segments including a base segment connected to said working fluid source and a discharge segment adjacent said outlet, and at least one member of said plurality of segments nests within a portion of an adjacent member.

58. A method of vectoring thrust, comprising the steps of:
providing an extendable conduit with an inlet connected to a working fluid source, said conduit defining a passage from said inlet to an outlet, said conduit having a plurality of coupled segments including a base segment connected to said working fluid source and a discharge segment adjacent said outlet, at least one member of said plurality of segments nests within a portion of an adjacent member;
providing working fluid from said working fluid source so that working fluid flows through said passage from said outlet to said inlet;
establishing a first thrust direction by extending said conduit and shaping said passage so that the direction of working fluid exiting said outlet is different than the direction of working fluid entering said inlet;
changing from said first thrust direction to a second thrust direction by positioning a first directing member mounted to said discharge segment adjacent said outlet to direct working fluid as it passes through said outlet.

59. The method of vectoring thrust of claim 58, further comprising the step of changing from the second thrust direction to a third thrust direction by positioning a second directing member, said second directing member being mounted to said discharge segment adjacent said outlet.

60. The method of vectoring thrust of claim 59, wherein said second-directing member is a guide vane mounted in said passage.

61. The method of vectoring thrust of claim 59, wherein said second directing member is a door configured to align with a wall of said conduit wall.

62. The method of vectoring thrust of claim 58, wherein said first directing member is a guide vane.

63. The method of vectoring thrust of claim 58, wherein said first directing member is a door configured to align with a wall of said conduit.

64. The method of vectoring thrust of claim 58, further comprising the step of stowing said extendable conduit so that said passage is generally straight.

65. A combination, comprising:
an aircraft;
a working fluid source mounted to said aircraft;
an extendable conduit defining a passage from an inlet to an outlet, said inlet being connected to said working fluid source, said conduit being adjustably extendable to controllably vary direction of working fluid exiting said outlet, said passage being generally straight when said conduit is unextended; and
at least three guide vanes mounted across said outlet, said vanes being selectively pivotable to controllably direct working fluid exiting said conduit.

66. The combination of claim 65, further comprising an actuation system coupled to said guide vanes.

67. The combination of claim 65, further comprising a pair of doors coupled to said conduit to selectively direct working fluid exiting said outlet.

68. The combination of claim 65, wherein at least one of said vanes has an airfoil shape with a varying curvature along a longitudinal axis.

69. The combination of claim 65, wherein said conduit includes a number of coupled segments.

70. The combination of claim 65, wherein at least two of the vanes have a substantially different degree of curvature.

71. The combination of claim 65, wherein said working fluid source includes a substantially asymmetric centerbody adjacent said inlet of said conduit, said centerbody being shaped to reduce working fluid flow separation.

72. The combination of claim 65, wherein said working fluid source is a lift fan positioned in a fuselage of said aircraft, said conduit is oriented relative to said aircraft to provide a transition between a take-off mode of said aircraft and a cruise mode of said aircraft, and said guide vanes are configured to adjust pitch of said aircraft during said transition.

73. A method comprising:
providing an aircraft with a thrust vectoring nozzle coupled to a working fluid source, the nozzle including an extendable conduit defining a passage with an outlet and a number of pivotable guide vanes positioned across the outlet;
discharging working fluid through the outlet to generate thrust to propel the aircraft;
propelling the aircraft in a first direction during said discharging with the conduit being in an unextended position, the passage being generally straight for the unextended position;
propelling the aircraft in a second direction during said discharging by extending the conduit, the second direction being substantially different than the first direction;
propelling the aircraft in a third direction during said discharging by pivoting the vanes, the third direction being substantially different from the first and second directions.

74. The method of claim 73, further comprising propelling the aircraft in a fourth direction during said discharging by further pivoting the vanes, the fourth direction being substantially different from the first, second, and third directions.

75. The method of claim 73, further comprising halting said discharging to operate the aircraft in a cruise mode.

76. The method of claim 75, further comprising stowing the nozzle in the unextended position during operation of the aircraft in the cruise mode.

77. The method of claim 73, wherein the working fluid source includes a lift fan and the first direction is generally vertical.

78. The method of claim 77, further comprising transitioning the aircraft from a vertical take-off mode to a cruise mode by controllably extending the conduit.

79. The method of claim 78, further comprising stabilizing said transitioning by controllably pivoting the vanes.

80. A combination, comprising:

an aircraft;

a working fluid source mounted to said aircraft;

a thrust vectoring nozzle coupled to said working fluid source to define a working fluid passageway with a discharge outlet, said passageway converging toward said discharge outlet, said nozzle including a selectively extendable segmented conduit to vector thrust produced by discharging working fluid through said discharge outlet; and a centerbody coupled to said working fluid source, said centerbody having a head terminating within said passageway, said head having a substantially asymmetric shape configured to reduce flow separation of working fluid passing through said passageway.

81. The combination of claim 80, wherein said head is shaped in a whale tail.

82. The combination of claim 80, wherein said passageway transitions from a generally annular cross-section to a generally D-shaped cross section.

83. The combination of claim 80, wherein said conduit includes a curved outer wall when extended and said head is shaped to direct working fluid passing from a portion of said passageway opposite said curved outer wall toward said curved outer wall.

84. The combination of claim 83, wherein said nozzle is configured to define a vent opposite said curved outer wall to reduce flow separation.

85. The combination of claim 80, wherein said nozzle includes a number of pivotable guide vanes positioned across said discharge outlet.

86. The combination of claim 80, wherein said head is substantially asymmetric along a first plane intersecting said head, said head is generally symmetric along a second plane intersecting said head, and said second plane is generally perpendicular to said first plane.

87. The combination of claim 80, wherein said conduit includes at least three coupled segments.

88. The combination of claim 80, wherein:

said working fluid source is a lift fan and said aircraft is configured for V/STOVL operation;

said nozzle includes at least three pivotable guide vanes positioned across said discharge outlet to controllably direct working fluid exiting said conduit;

said conduit includes at least five coupled segments configured to turn working fluid when extended, said conduit is oriented relative to said aircraft to provide a transition between a take-off mode of said aircraft and a cruise mode of said aircraft, and said guide vanes are configured to adjust pitch of said aircraft during said transition; and said head is substantially asymmetric along a first plane intersecting said head, said head is a generally symmetric along a second plane intersecting said head, said second plane is generally perpendicular to said first plane, said pivot point lies in said first plane, and said first plane intersects each of said guide vanes.

89. A thrust vectoring system, comprising:

an aircraft with a fuselage having a lift fan mounted therein, said lift fan being selectively operable to discharge working fluid when said aircraft operates in a V/STOVL mode;

an extendable conduit defining a passage from an inlet to an outlet, said inlet being connected to said lift fan to receive the working fluid therefrom and provide an adjustable thrust vector for said aircraft when said lift fan is operating; and a first vane mounted across said outlet, said first vane having a first end portion opposing a second end portion along a first longitudinal axis and a first pair of opposing directing surfaces, said first pair of opposing surfaces each having a first curvature near a midpoint between said opposing ends and a second curvature at said first end portion, said first curvature being greater than said second curvature.

90. The system of claim 89, further comprising:

a second vane mounted across said outlet along a second longitudinal axis; and a third vane mounted across said outlet along a third longitudinal axis;

wherein said first, second, and third longitudinal axes are generally parallel, and said second and third vanes have a varying curvature.

91. The system of claim 89, wherein said conduit includes at least three pivotably coupled segments.

92. The system of claim 89, wherein said vanes number at least four.

93. The system of claim 89, wherein said vanes number at least four, said conduit includes at least three coupled segments operatively coupled to an actuation system to selectively vector thrust during said V/STOVL mode by pivoting said segments relative to each other.

94. A thrust vectoring system, comprising:

an aircraft with a fuselage having a lift fan mounted therein, said lift fan being operable to discharge working fluid along a generally vertical axis when said aircraft operates in a V/STOVL mode;

an extendable conduit defining a passage from an inlet to an outlet, said inlet being connected to said lift fan to receive the working fluid therefrom, said conduit including a number of coupled segments, said segments being pivotably adjustable to change direction of the working fluid exiting through said outlet and provide an adjustable thrust vector for said aircraft having a vertical directional component which is greater for a collapsed position of said conduit than an extended position of said conduit when said lift fan is operating; and at least three vanes mounted across said outlet, said vanes being carried by one of said segments.

95. The system of claim 94, wherein said vanes each have a corresponding longitudinal axis generally parallel to said corresponding longitudinal axis of another of said vanes.

96. The system of claim 94, wherein said vanes each have a varying curvature along said corresponding longitudinal axis.

97. The system of claim 94, wherein said vanes number at least four and said segments are operatively coupled to an actuation system to selectively vector thrust during said V/STOVL mode.

98. The system of claim 97, further comprising a substantially asymmetrically shaped centerbody coupled to said lift fan, said centerbody cooperating with said conduit to reduce flow separation.

99. The system of claim 94, further comprising a centerbody coupled to said lift fan and a converging shroud interconnecting said conduit and said lift fan, at least a portion of said centerbody being enclosed in said shroud.

100. The system of claim 99, wherein said vanes number at least four, said segments number at least three, and said centerbody has a substantially asymmetric shape configured to reduce flow separation of the working fluid passing through the conduit.

* * * * *